May 9, 1950
C. H. BOST
2,507,242
TERMINAL BOX ASSEMBLY FOR POLYPHASE ELECTRIC
MOTORS WITH CHANGEABLE CONNECTIONS
Filed March 1, 1949
2 Sheets-Sheet 2
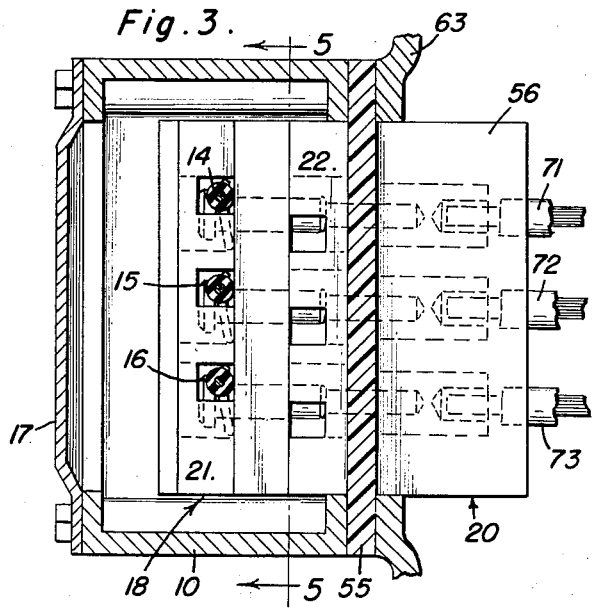
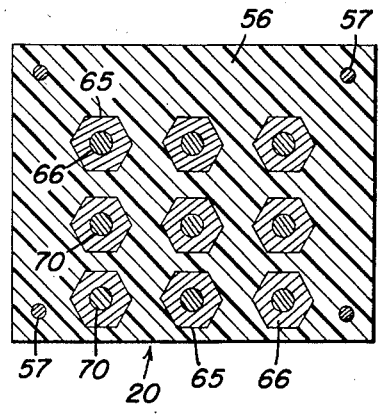
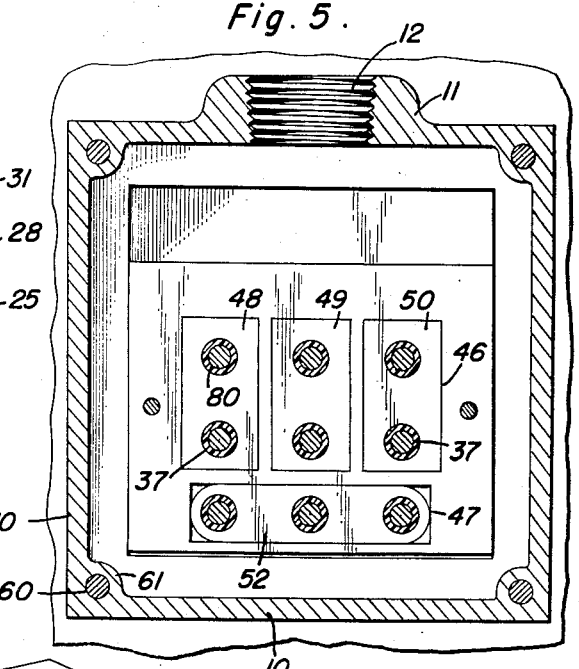
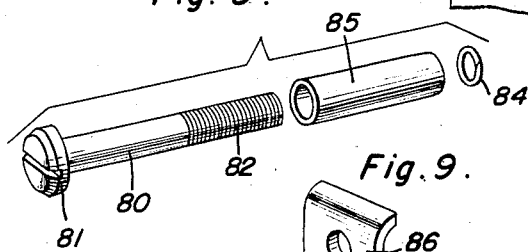
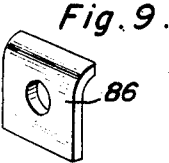
Inventor
Charles H. Bost
By Clarence A. O'Brien
and Harvey B. Jacobson
Attorneys Patented May 9, 1950

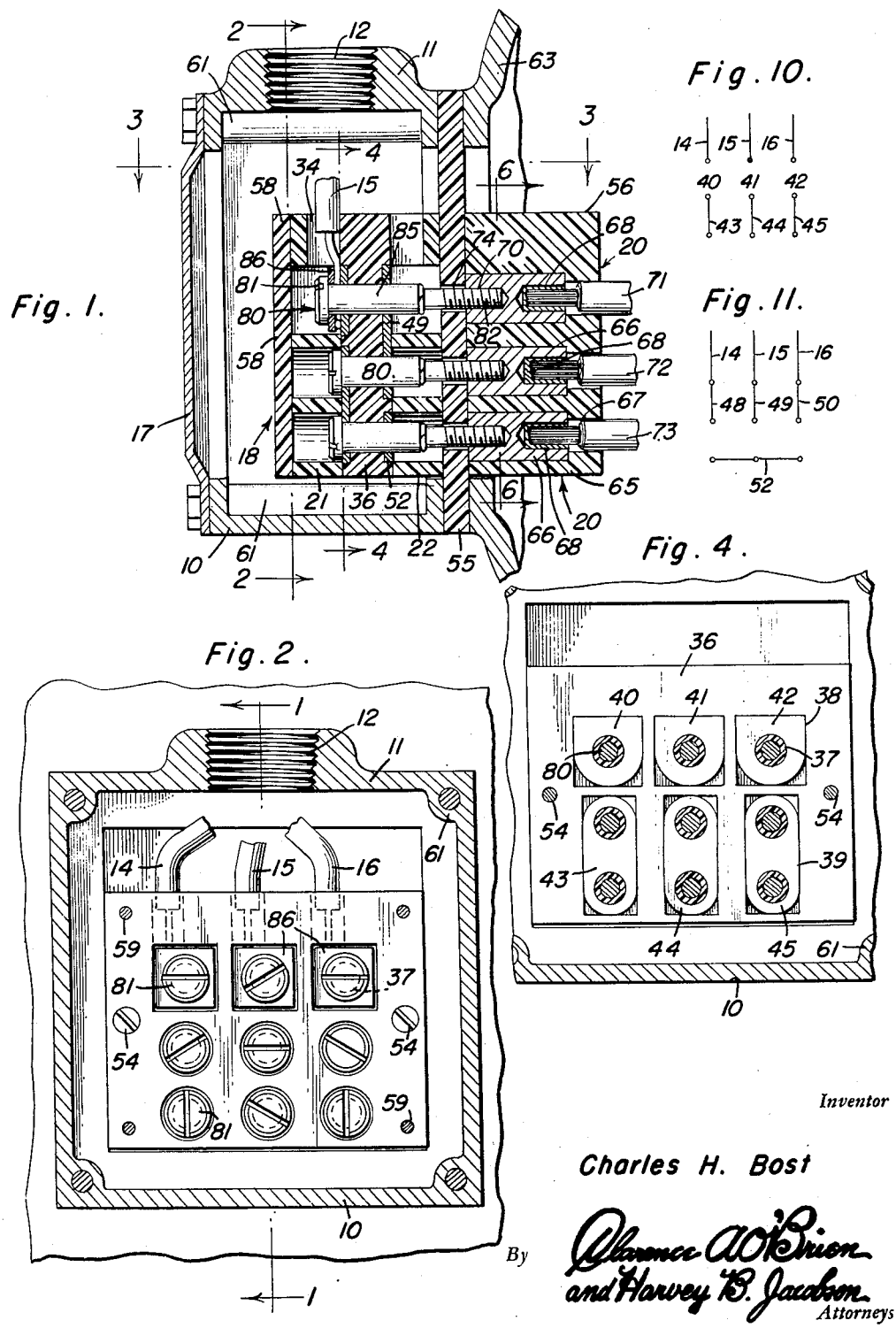

2,507,242

UNITED STATES PATENT OFFICE 2,507,242

TERMINAL BOX ASSEMBLY FOR POLY-
PHASE ELECTRIC MOTORS WITH CHANGE-
ABLE CONNECTIONS

Charles H. Bost, Lake Wales, Fla.

Application March 1, 1949, Serial No. 79,038

8 Claims. (Cl. 173—324)

This invention relates to terminal box assemblies for polyphase electric motors and more particularly to assemblies for motors working under a number of different operational conditions, such as high voltage and low voltage operation. It is a main object of this invention to provide a terminal box assembly in which the different connections necessary for such a change of conditions are pre-formed and in which therefore the change from one operational condition to the other may be made without difficulty and in which also disconnection or the re-making of the connection is possible using throughout connections meeting all requirements.

It is a further object of the invention to provide a terminal box assembly which is a unit, supporting itself on the casing of the electric motor, but which nevertheless may be disassembled and reassembled for a change of connection or for a disconnection such as may be necessary for the operation of the polyphase motor under different operational conditions or for the testing of a pair of the electric motor.

It is a further object of the invention to provide a terminal box assembly consisting of two block assemblies which are disconnectable, one of said assemblies being fixedly connected with the casing of the electric motor while the other block assembly is reversible and is supported by the first assembly by means of connector bolts which transmit the electric current from the cable to the leads of the electric motor and which are connected with each other or with the phase conductor cables by means of fixed connecting strips on the reversible assembly.

It is a further object of the invention to provide a terminal box assembly of the type described in the preceding paragraph in which different interconnections between the connector bolts are pre-formed on the two sides of the reversible block assembly, one of said pre-formed interconnections being operative by its contact with a protruding head of the connector bolt which is applied against it, while the other pre-formed said interconnection is inoperative, such inoperativeness being produced by an insulating sleeve on the connector bolt which excludes contact between the shaft of the bolt and the block carrying the set of pre-formed interconnections.

It is a further object of the invention to provide a terminal box assembly which may be supported on the casing of the polyphase electric motor and which consists of a number of block assemblies supporting themselves on said casing and supporting each other by means of the connector bolts provided to produce electrical connections, said block assembly being protected and shielded within a casing which is also supported on the casing of the electric motor simultaneously with the block assembly.

Further and more specific objects will be apparent from the following detailed specification.

One embodiment of the invention is described with reference to the accompanying drawing and the following specification. It is, however, to be understood that this embodiment is illustrated by way of example in order to be able to explain the principle of the invention and the best mode of applying said principle. The fact that merely one embodiment of the invention is described and illustrated is therefore not to be interpreted as limitative. It will be obvious to the expert skilled in the art that other embodiments of the invention may be based on the same principle and modifications of the embodiment shown do not therefore constitute necessarily a departure from the invention.

In the accompanying drawings:

Figure 1 is a sectional elevational view of the terminal box assembly, the section being taken along line 1—1 of Figure 2.

Figure 2 is an elevational partly sectional view of the terminal box assembly, the section being taken along line 2—2 of Figure 1.

Figure 3 is a partly sectional plan view of the assembly, the section being taken along line 3—3 of Figure 1.

Figure 4 is an elevational partly sectional view, the section being taken along line 4—4 of Figure 1.

Figure 5 is an elevational partly sectional view, the section being taken along line 5—5 of Figure 3.

Figure 6 is a sectional elevational view, the section being taken along line 6—6 of Figure 1.

Figure 7 is a perspective view of one of the lateral blocks of the cable terminal head.

Figure 8 is a perspective view of a connector bolt and the elements carried by it, said elements being shown separately.

Figure 9 is a perspective view of the washer carried by the bolt and used for clamping the strands of the phase conductor cables.

Figures 10 and 11 show diagrammatically the connections which are made by the connecting strips.

As already above explained, the invention comprises a terminal box assembly for polyphase motors, adapted to be operated with two different voltages, say a high and a low voltage in which different connections are made. The terminal box assembly comprises block assemblies permitting to effect a change from operation with one voltage to operation with another voltage or the disconnecting of the motor from the line for checking purposes and the remaking of the connection after the change or after a check up very speedily by means of manipulations which are easily performed and which do not include the fastening of lugs, soldering or taping of joints. Moreover, the use of the block assembly also excludes the making of wrong connections due to errors or to the failure to make proper markings.

The example which is illustrated in the drawings and which is hereafter described shows a terminal box assembly for a three phase electric motor capable of operating under a dual voltage.

The terminal box assembly according to the invention comprises a metal casing which consists of a receptacle box 10 open at two sides which is provided on its cover or on its upper portion with a hole 12. The top portion or cover containing the hole 12 may be turned in any one of three or four directions in order to be in line with the direction in which the cables 14, 15, 16 containing the phase conductors are laid out.

The receptacle 10 may be provided with a lid 17 which is fastened to the box in a manner to be described.

The casing 10 is fastened to a casing 63 of the three phase motor and it houses one part of the block assembly which consists essentially of two heads or assemblies. One of said assemblies, indicated generally by the reference numeral 18 is a cable terminal head, while the other assembly, generally indicated at 20 is a motor head assembly. The cable terminal head block 18 consists of four members which may however form a single unit, as will be described below. Two of these members 21 and 22 are shown in Figure 7 and are substantially identical. These members consist of a block of insulating material 30 provided with rows of circular bores or holes 23, 24, 25, 26, 27, 28 which are arranged in phase groups. Further holes 29, 31, 32 are shown as being square openings or holes, and each of said holes is allotted to and forms part of one of said phase groups. The square openings or holes 29, 31, 32 communicate with laterally open channels 33, 34, 35 leading to the upper surface of the block (Figure 7) through which the cables 14, 15, 16 may be introduced.

The two members 21, 22 are symmetrically arranged on both sides of a central connection strip block 36 of insulating material which is provided with a number of circular holes 37, which are axially aligned with the centers of the holes in the members 21 and 22. On each side of the insulating block 36 shallow recesses 38, 39 are provided into which metallic connection strips 40, 41, 42, 43, 44, 45 are fitted. The recesses and the connecting strips on the front side are shown in Figure 4. It will be noted that in the upper row each recess 38 and connecting strip 40, 41, 42 is separated from the adjacent recesses and strips while in the two lower rows the recesses 39 and the connecting strips 43, 44, 45 are of such length that they surround the holes 37 belonging to one of the phase groups.

On the opposite side of the block 36 which is shown in Figure 5 and which in the position of the block as shown in Figure 1 is the rear side, the recesses 46 and 47 and the connecting strips 48, 49, 50 and 52 are differently arranged, corresponding to the different connections to be made with high voltage and low voltage operation.

In the example shown the recesses 46 and the connecting strips 48, 49, 50 surround each the two upper holes of each phase group while the strip 52 and recess 47 surrounds and connects corresponding holes of one row, thus joining all three phase groups.

The three members 21, 36, 22 of the cable terminal head are shown as separate units which are joined by screw bolts preferably with countersunk heads, such as shown at 54 in Figures 2 and 4. However, it will be understood that the three members 21, 36, 22 may be molded together to form a single piece after the metallic contact strips have been inserted and have been fixed.

The front side of the cable terminal block assembly is preferably closed by a closure plate 58 which covers the entire front side of the block and which may be fastened to the same by screws, such as shown at 59 (Figure 2).

It will be noted that on account of the symmetrical shape of the cable terminal block assembly 18 this assembly may be inserted either in the way which is shown in Figure 1 or in the way in which its rear side is turned toward the front and its front side towards the rear.

The second assembly which has been termed the motor head assembly and which is generally designated by the reference numeral 20 comprises a supporting cover plate 55 and a block 56 both of insulating material. The cover plate 55 is of such size that it closes the open side of the receptacle 10. The said cover plate 55 carries the block 56 by means of screw bolts such as shown at 57. The plate itself is fastened to the casing 63 and to the receptacle 10 by means of transverse bolts 60 which pass through bores in reinforced portions or lugs 61 of the receptacle 10. The bolts are of such length that they run from one side wall of the receptacle and to the other side wall and they may therefore be used for the porpose of fastening the lid or cover 17 as well as the supporting cover plate 55 of the motor head to the motor casing 63. Preferably these bolts are threaded at their ends (in a manner not shown) and are fixed in suitable threaded holes of the motor casing 63.

The bolts 60 thus serve the triple purpose of holding the receptacle 10 on the casing 63, of holding the motor head block 56 in its position and of holding the lid covering the receptacle 10. As the motor head block 56 also holds the cable terminal block 21 in a manner to be described, these bolts practically support the entire structure and hold it on the casing of the electric motor to which they are fixed.

The block 56 consists of insulating material and is provided with rows of hexagonal bores 65 each of which houses and holds a hexagonal connector bar 66. The hexagonal bores preferably do not run from one end to the other of the block 56 but they meet and communicate with round or square bores 67 penetrating the block 56 on the other side, which bores 67 are somewhat smaller than the hexagonal holes so that a seat for the connector bar 66 is provided which holds the bars in a position in which their outer surface is flush with the face of the block 56 which is applied against the supporting plate. The connector bars are thus firmly held on both sides even if not specially fixed by further means.

Each connector bar 66 is provided with two coaxial bores 68, 70 penetrating into the bar from different ends. The bore 68 penetrating into the connector bar from the inner side which is next to the motor casing is a smooth cavity of appropriate depth. This cavity serves to take up the ends of one of said motor leads 71, 72, 73 and to establish electrical connections between the motor leads and the connector bars. The end of the motor lead is therefore soldered to the connecting bars 66 or may be connected in any other appropriate fashion securing good electrical connection under the given conditions.

The second axial bore 70 is a threaded bore penetrating from the outer or front side which is covered by the supporting cover plate 55. The cover plate 55 is provided with suitable holes 74 located in front of and aligned with each of said bores 70 in the connecting bar 66.

It will be understood that the rows of hexagonal bores in the block 56 and their arrangement in vertical phase groups corresponds to the arrangement of holes 23–31 in the block 30 and to the arrangement of bores in the connection strip block 36, so that the bores 70 are axially aligned with the centers of the bores provided in the three blocks 21, 36, 22.

Through the axially aligned bores connector bolts or terminal screw bolts 80 are inserted which are provided with a head 81 and with a threaded end portion 82. Each of said connector bolts is provided with an insulating sleeve 85 covering its front part and held by means of a collar 84 which is slid over the screw bolts and which holds the sleeve 85 in its place on the shaft of the screw bolt.

As will be seen from Figure 1 the screw threaded part 82 of the bolt 80 passes through the holes 74 in the supporting cover plate 55 and engages the screw threads in the bore 70 so that the bolt is firmly held within the connecting bar 66. The sleeves 85 which are seated on the front portion of the shaft of the bolt 80 fit snugly into and fill the bores 37 of the block 36. The bolts and sleeves are thus capable of supporting the central blocks 36 together with the two outer blocks 21, 22 which are attached or molded to it. It is thus seen that the cable terminal head is supported by the holes of the motor head, the bolts 80 not only holding the block assembly 18 but pressing it firmly against the plate 55.

The three upper connector bolts projecting into the square holes 29, 31, 32 are moreover provided with an elastic washer 86 which clamps the bare metallic ends of the cables which usually form loops. These ends of the phase conductor cables 14, 15, 16 enter into the holes 29, 31, 32 through the channels 33, 34, 35.

It will now be readily understood that the terminal box is ready for dual operation with high and with low voltage according to the position which the cable terminal head and more specifically the central block 36 occupies.

Let it be assumed that the high voltage operation is desired and that this operation requires connections such as shown in Figure 10, said connections being provided by the contact strips 40, 41, 42; 43, 44, 45 in Figure 4.

The cable terminal block is then turned or inserted in such way that the side of the block 36 provided with the above enumerated contact strips is turned outwardly towards the side of the receptacle 10 which is covered by the lid 17. The connector bolts 80 provided with the sleeves 85, held by the collars 84, are then inserted and are screwed into the connecting bars 66 with their threaded ends, the ends of the phase conductor cables are clamped under the washers 86 and the electric motor is now ready for operation. Before closing the receptacle the cover or closure plate 58 may of course be applied from the front end of the cable terminal block.

The connections are now determined by the connecting strips which are on the front or outer side while the strips on the inner side of block 36 are inoperative. This will be clear as the connection between the phase conductor cables 14, 15, 16 and the connector strips is produced by the washers 86 or directly by the heads 81 of the connector bolts 80. Therefore the connection extends to the connector bars 66 which, in their turn, are connected with the motor leads 71, 72, 73. However, connecting strips 48, 49, 50, 52 which are now on the rear side of the block 36 facing the electric motor are inoperative on account of the insulating sleeves 85 on the connector bolts 80 which prevent contact between the connector bolt 80 and said strips. The connections between the motor leads 72, 73 leading to the field and armature connections of the motor are now made by their connection strips 43, 44, 45 in conjunction with strips 40, 41, 42 which lead to the phase conductor cables.

If the motor has to be disconnected or if connections have to be changed, for instance, if instead of the connections as shown in Figure 10 connections such as shown in Figure 11 have to be made which correspond to low voltage operation the phase conductor cables are disconnected, the closure plate 58 is removed and the block 18 is turned around so that the side of block 36 shown in Figure 5 now faces the outer side turned toward the lid 17. The connections are now determined by strips 48, 49, 50, 52 while the connection strips 40—45 on the other side of block 36 are now inoperative.

If more than two operational conditions or stages are to be provided for, the terminal head 18 or the block 56 may be made interchangeable to provide for the required number of different connections.

The advantage over the methods now used consists in the fact that there are no lugs to fasten and no joints to be provided with tape or wires to be soldered when a change of connection is desirable.

The above described terminal block also eliminates the possibility of a wrong connection of the wires. The motor may therefore be quickly removed from the line for checking or for other purposes and may be put back in service in a short time without error due to the wearing off of the marks on the wires.

Obviously minor changes or changes of an unessential nature would not in any way affect the essence of the invention.

Having described the invention, what is claimed as new is:

1. A terminal box assembly for polyphase electric motors, capable of making at least two different sets of connections between cables containing phase conductors and motor leads and between the latter, comprising an insulating block, provided with connector bars for each motor lead, a further insulating block, provided with connecting strips on two surfaces, said strips surrounding holes provided in said block and alignable with the connector bars, connector bolts provided with heads and insulating sleeves on a portion of their length, corresponding to the width of said last mentioned connection strip carrying block, said bolts passing through the holes of said connection strip carrying block, the head of each bolt resting on the connector strip surrounding the hole through which it passes and said bolts being adapted to be brought into operative electric contact with the connector bars, means for connecting the phase conductor cables with some of said connector bolts and means connecting the motor leads with the said connector bars.

2. A terminal box assembly for polyphase electric motors capable of making at least two different sets of connections between cables containing phase conductors and motor leads and between the latter, comprising a motor head assembly, including an insulating block carrying a number of connector bars, corresponding to the number of motor leads, each connector bar being operatively connected with one of said motor leads, a cable terminal head, including an insulating block, provided with transverse bores, axially aligned with the connector bars, and further provided with connecting strips on both of its sides, surrounding said bores, some of said connecting strips surrounding groups of bores, connector bolts provided with heads and insulating sleeves on a portion of their length, corresponding to the width of said last mentioned connection strip carrying block, said bolts passing through the holes of said connection strip carrying block, the head of each bolt resting on the connection strip surrounding the hole through which the connector bolt passes and said bolts being adapted to be brought into operative electric contact with the connector bars, means for connecting the phase conductor cables with some of said connector bolts and means for connecting the motor leads with the said connector bars.

3. A terminal box assembly for polyphase electric motors capable of making at least two different sets of connections between cables containing phase conductors and motor leads and between the latter, comprising a motor head assembly including an insulating block, carrying a number of connector bars, corresponding to the number of motor leads, each bar being operatively connected with one of said leads, and provided with a threaded bore, a cable terminal head, consisting of three insulating blocks in fixed connection with each other forming a reversible unit, capable of adopting two different positions, the central block being provided with a number of bores, axially aligned with the connector bars, and being further provided with connecting strips on its two outer surfaces surrounding said bores, some of said strips surrounding a plurality of bores, said two outer blocks being provided with bores aligned with those of the central block for giving access to the latter, connector bolts provided with heads and with insulating sleeves on a portion of their length corresponding to the width of said last mentioned connection strip carrying block, said bolts passing through the holes of said connection strip carrying block, the head of each bolt resting on the connection strip surrounding the hole through which the bolt passes and said bolts being adapted to be brought into operative electric contact with the connector bars, means for connecting the phase conductor cables with some of said connector bolts, and means for connecting the motor leads with the said connector bars.

4. A terminal box assembly for polyphase electric motors capable of making at least two different sets of connections between cables containing phase conductors and motor leads and between the latter, comprising a motor head assembly including an insulating block, carrying a number of connector bars, corresponding to the number of motor leads, each bar being operatively connected with one of said leads, and provided with a threaded bore, a cable terminal head, consisting of three insulating blocks in fixed connection with each other forming a reversible unit, capable of adopting two different positions, the central block being provided with a number of bores, axially aligned with the connector bars, and being further provided with connecting strips on its two outer surfaces surrounding said bores, some of said strips surrounding a plurality of bores, said two outer blocks being provided with bores aligned with those of the central block for giving access to the latter, connector bolts provided with heads and with insulating sleeves on a portion of their length, corresponding to the width of said last mentioned connection strip carrying block, said bolts passing through the holes of said connection strip carrying block, the head of each bolt resting on the connection strip surrounding the hole through which the bolt passes, said bolts being further provided with threaded end portions adapted to engage the threaded bores of the connector blocks, means for connecting phase conductor cables with some of said connector bolts and means connecting the motor leads with the said connector bars.

5. A terminal box assembly for polyphase electric motors capable of making at least two different sets of connections between cables containing phase conductors and motor leads and between the latter, comprising a motor head assembly including an insulating block, carrying a number of connector bars, corresponding to the number of motor leads, each connector bar being operatively connected with one of said motor leads, and provided with a threaded bore, said connector bars being arranged in a plurality of rows and the bars within the rows being aligned in phase groups, connector bolts provided with heads and with insulating sleeves and with threaded end portions, the latter engaging the threaded bores of the connector bars, a cable terminal head, consisting of three insulating blocks, in fixed connection with each other, forming a reversible unit, capable of adopting two positions, the central block being provided with a number of bores, axially aligned with the connector bars, and being further provided with connecting strips on its two outer surfaces, surrounding said bores, some of said strips surrounding a plurality of bores, the connecting strips of the face turned outwardly being in operative contact with the heads of the connector bolts, when the latter are threaded through the aligned bores of the cable terminal head for engagement with the connector bars, the connection strips on the face turned inwardly towards the motor being insulated from the said bolts by the insulating sleeves, means for connecting the phase conductor cables with some of said connector bolts and means connecting the motor leads with the said connector bars.

6. A terminal box assembly for polyphase electric motors adapted for making at least two different sets of connections between cables containing phase conductors and motor leads, and between the latter, a motor casing, a motor head assembly, comprising an insulating supporting plate, adapted to be fixed to the casing, and an insulating block fixed to said plate provided with a number of bores, connector bars fitting into said bores and housed and held within the same, said bores and bars corresponding to the number of motor leads, each connector bar being electrically connected with one of the motor leads and provided with a threaded bore, said connector bars being arranged in a plurality of rows, and the bars within the rows being aligned in phase groups, connector bolts provided with heads and further provided with insulating sleeves and threaded end portions, the latter engaging the threaded bores of said connector bars, and being held by said connector bars, a cable terminal head, consisting of three insulating blocks in fixed connection with each other, forming a reversible unit, capable of adopting two positions, the central block being provided with a number of bores, axially aligned with the connector bars, and being further provided with connecting strips on its two outer surfaces, surrounding said bores, some of said strips surrounding a plurality of bores, the two outer blocks being provided with bores aligned with those of the central block for giving access to the latter, and the said cable terminal head being supported by the connector bolts and sleeves fitting into the holes of the central block, pressed against the supporting plate by the heads and threaded end portions of said connector bolts, and supported by the latter engaging the connector bar, means for connecting the phase conductor cables with some of said connector bolts and means for connecting the motor leads with the said connector bars.

7. In a terminal box assembly as claimed in claim 6, a receptacle with two open sides, one open side being closed by the supporting plate, carrying the block of the motor head on one side and carrying the cable terminal head on the other side and within the receptacle, and a lid for closing the other open side of the receptacle.

8. In a terminal box assembly as claimed in claim 6, a receptacle with two open sides, fixed to said supporting plate and to said motor casing, said receptacle being provided with an opening for the phase conductor cables, one side of the receptacle being covered by the supported plate carrying on its outer side the motor head block provided with the connector bars, and on the inner side facing the receptacle the cable terminal head by means of the connector bolts engaging the connector bars.

CHARLES H. BOST.

REFERENCES CITED

The following references are of record in the file of this patent:

UNITED STATES PATENTS

| Number | Name | Date |
|---|---|---|
| 1,554,647 | Oswold | Sept. 22, 1925 |
| 2,321,999 | Dalton | June 15, 1943 |
| 2,403,642 | Draxler | July 9, 1946 |
| 2,450,657 | Guernsey | Oct. 5, 1948 |

FOREIGN PATENTS

| Number | Country | Date |
|---|---|---|
| 344,845 | Great Britain | Mar. 5, 1931 |